Sept. 26, 1961  J. W. CRANFORD  3,001,430
PREDETERMINED TORQUE RELEASE TOOL
Filed Dec. 22, 1958  2 Sheets-Sheet 1

INVENTOR.
JAMES W. CRANFORD
BY Orville R. Leidner
AGENT

Sept. 26, 1961   J. W. CRANFORD   3,001,430
PREDETERMINED TORQUE RELEASE TOOL
Filed Dec. 22, 1958   2 Sheets-Sheet 2
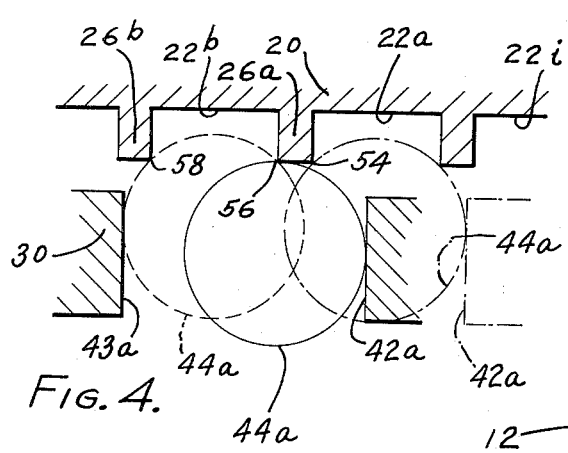
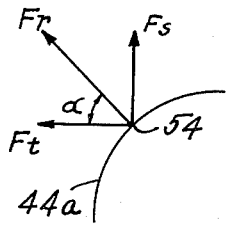
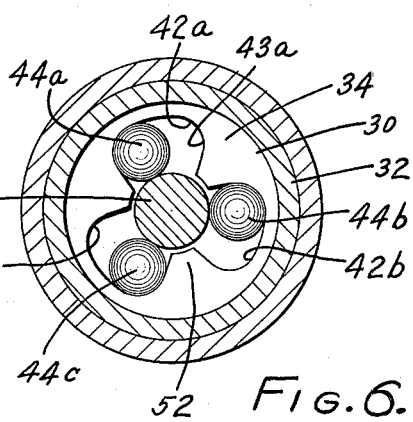
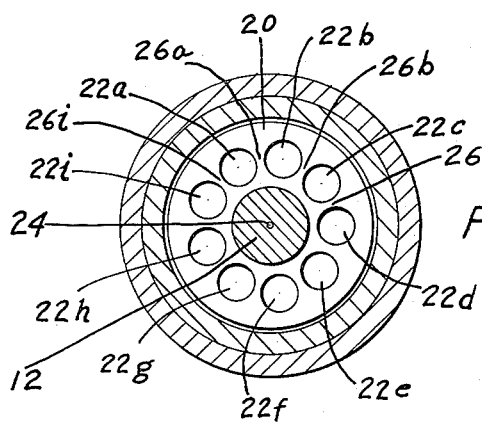
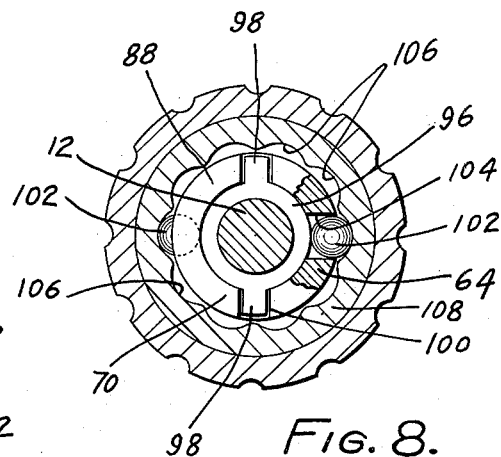
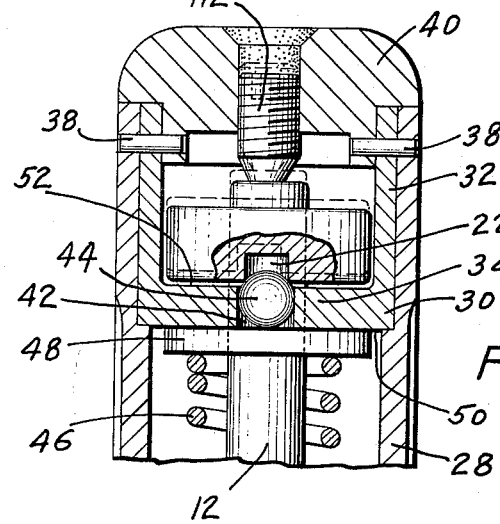
INVENTOR.
JAMES W. CRANFORD
BY Orville R. Seidner
AGENT

3,001,430
PREDETERMINED TORQUE RELEASE TOOL
James W. Cranford, 5565 N. Charlotte Ave.,
San Gabriel, Calif.
Filed Dec. 22, 1958, Ser. No. 782,020
6 Claims. (Cl. 81—52.4)

This invention relates to driving tools generally, and more particularly relates to driving tools of the torque limiting type.

Due to many factors inherent in modern technology, it has become the custom of the engineering profession to prescribe the torque limits to be applied to screw head elements user for joining parts together in secured relationship. These torque limits are precisely defined in order that the elastic limits of the elements and the joined parts will not be exceeded and yet the parts will be secured as tightly together as required by specification.

For example, in the automotive art it is desirable and necessary that the torque on the bolts or studs which fasten the head to the block of the engine be prescribed for the factory assemblers who fabricate the power plants and the mechanics who will thereafter have occasion to service the engine. At the other end of the scale, delicate instruments are fabricated from a variety if materials, including plastics, relatively soft metals, hard metals, etc., some or all of which are sometimes secured together by tiny screws. In such cases it is essential that torque limits be indicated whereby the parts will be secured without stripping of threads.

To the end that specified torque limits may be met and not exceeded, tool engineers have devised driving tools known as torque wrenches, screwdrivers, and the like. In some of these, a resilient beam, to which a torque force is to be applied, carries a pointer arranged to cooperate with a fixed indicia scale calibrated in various torque values of pound-feet, ounce-inches, or the like. Other tools known comprise an adjustable friction device interposed between the driver and the driven part, while still others include a ball detent mechanism arranged to transmit the torque force.

The present invention is of the latter type, and while the embodiment shown and described is that of a screw-driver, it will be appreciated by those skilled in the art that the invention has wider application and is not limited to a screwdriver.

The disclosed embodiment of the invention comprises a tool bit, arranged to engage a screw or the like, and a generally cylindrical handle, arranged to be grasped by hand for driving a screw. A ball cage member containing a plurality of torque transmitting balls forms a part of the interior of the handle disposed adjacent a cam plate member forming a part of the end of the tool bit disposed in the handle. The cam plate defines a plurality of recesses, some of which are adjacent and facing the recesses in the cage member within which the torque transmitting balls are disposed. A bias spring tends to resist depression of the balls into the cage recesses, but the cam plate recesses (being somewhat smaller than the balls) receive the balls only partially therewithin. The arrangement is such that the edges of the recesses in the cam plate engage the balls at points thereon where the component of the torque force exerted on the handle and the component of the spring bias force are substantially equal at the instant the torque limit is reached.

This construction, which is not known to be present in available torque limiting tools, is important for two reasons. First, a greater amount of torque may be transmitted by smaller elements compatible with the second reason that when the torque limit is reached, the ball detent must give or "break away" quickly in order that the limiting torque will not be exceeded. This structure also contributes to "repeatability." That is, for a given torque limit setting, the ball detent will always give and break the torque precisely at that setting from one operation to the next.

Accordingly, it is an object to provide a tool as aforesaid.

It is another object to provide a tool wherein the relationship of the ball cage and cam plate elements may be varied within reasonable limits without departing more than nominally from the angular relationship between the torque force component, spring bias force component, and resultant force as set forth above. This arrangement permits calibration of the tool to the particular bias spring used, hence precision fabrication of the bias spring to close tolerances need not be specified. Also, manufacturing tolerances for the other tool parts, particularly the cam plate, may be relaxed, hence the tool may be fabricated at less cost.

It is also an object to provide a tool in which the spring bias force is adjustable to provide various predetermined torque limits of the tool, calibrated scales on the tool being provided which closely resemble the sleeve and thimble scales on the familiar and well known micrometer. It is a particular object in this connection to provide spring biased detent means for holding the torque limit settings against change during the use of the tool, but which settings are easily and quickly changed preferably by manipulation of a slidable and rotatable collar element. In the preferred construction shown, the adjustment collar is disposed about the tool bit shank distally of the handle whereby it is not subject to inadvertent manipulation during the use of the tool.

It is a still further object to provide a torque limiting tool structure in which substantially no reverse torque is manifest on the bit of the tool when the torque applied to the bit tends to exceed that torque for which the tool is set. In ball detent mechanisms of this general nature there is relative motion between the ball carrying cage and the cam plate contacted by the balls as the torque limit tends to be exceeded. In effect, the balls progress from one recess to a succeeding one in the cam plate, and as they pass the edge of the succeeding recess they tend to exert a torque in the reverse direction to that applied, and hence the reverse torque has a tendency to loosen the part being tightened by the tool bit. The reverse torque is a direct consequence of the sizing of the recesses in the ball cage to a diameter just slightly greater than that of the balls.

The present invention overcomes this objectionable feature by the novel expedient of providing elongated recesses in the ball cage, whereby the passage of the balls therein over dead center with respect to the cam plate recess edges results in a snap of the balls to the distal walls of the cage recesses without any substantial net reverse torque effect on the cam plate. Substantially, the balls contact the next succeeding recesses in the cam plate in such manner as to nullify any reverse torque manifest at the instant of snap. The invention also contemplates elongated recesses of such dimensions that the snap of the balls is also manifest on the distal walls thereof with a distinct "feel" of the ball snap in the tool handle.

This last mentioned "feel" of ball snap is a decided advantage of the tool inasmuch as the operator is immediately apprized of the fact that the threaded part has been torqued to the limit. It occasionally happens that the tool is being applied in a blind spot so far as visual observation is concerned, hence the snap as sensed by the operator's hand is a distinct signal to him of that which he cannot see. There may be an audible "click" as the successive cam plate recesses are presented to the balls, but environmental noise may be of a higher level. Hence the operator may have to depend on accomplishing the torque operation by "feel."

It is another object to provide a torque limiting drive tool of relatively simple structure comprised of a minimum of elements which are easily fabricated and assembled by unskilled personnel, whereby the cost of the tool is kept within reasonable limits so as to make it available to the greatest part of the interested public at attractive prices.

Other and further objects will suggest themselves and be apparent to those skilled in the art upon consideration of the following description when considered in connection with the appended drawings, wherein:

FIG. 4 is a schematic representation of torque transmitting elements, illustrating operation phases when the torque limit setting tends to be exceeded;

FIG. 5 is a force vector diagram of the forces acting on the torque transmitting balls;

FIG. 6 is a cross section view taken on the line 6—6 of FIG. 1, showing the elongated recesses in the ball cage;

FIG. 7 is a cross section view taken on the line 7—7 of FIG. 1, showing the cam plate recesses;

Figure 1:
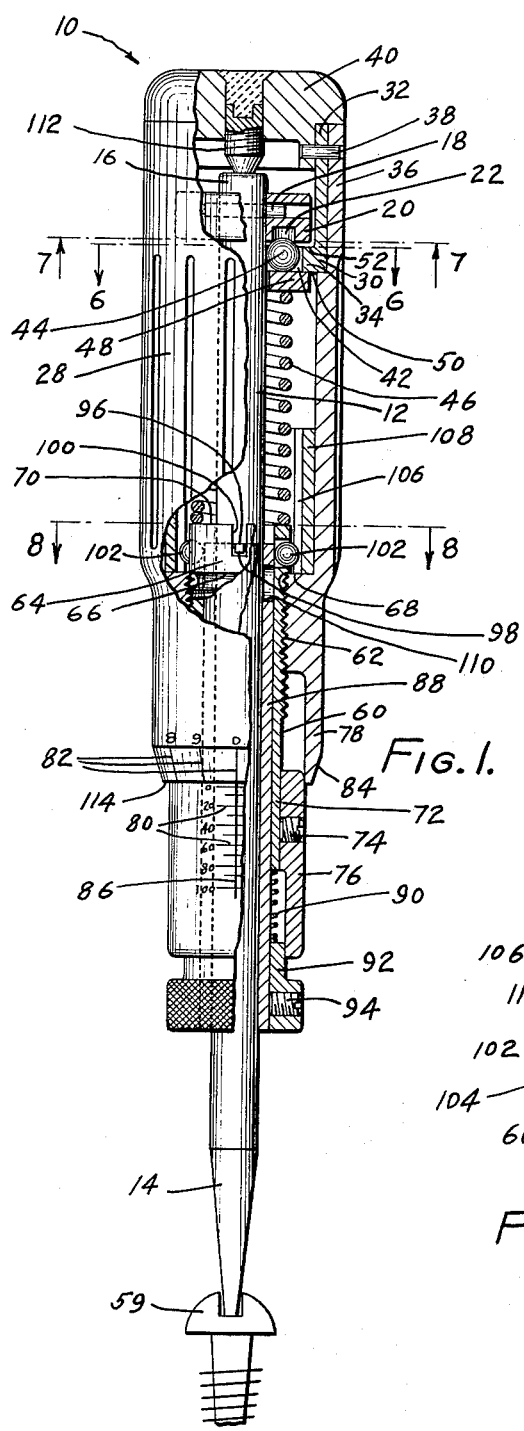
FIG. 1 is a partially sectioned view of an embodiment of the invention.

FIG. 8 is a cross section view taken on the line 8—8 of FIG. 1, showing adjustment locking parts in another position; and FIG. 9 is an enlarged fragmentary cross section view of the upper portion of the device shown in FIG. 1, and showing by dashed lines an exaggerated representation of the adjustment of the cam plate member in the procedure by which calibration may be had for bias spring variations within commercial tolerances.

FIGURES 3 through 8 are drawn to enlarged scale.

Referring to the figures, the screwdriver 10 is shown as comprised of a tool bit shank 12 formed at one end with a screwdriver bit 14 and having secured to the other end 16, as by means of a dowel pin 18 or the like, a radially disposed cam plate member 20. As best seen in FIGS. 1 and 7, the member 20 is provided with a plurality of shallow recesses 22, which are more particularly referenced on FIG. 7 as 22a, 22b, 22c, etc., each equidistantly disposed from its neighbor and all equidistantly disposed from the axis 24 of the shank 12. As shown, the recesses 22 are nine in number for the purpose of spacing them close together with only thin walls 26a, 26b, 26c, etc., intermediate the recesses.

The screwdriver 10 is further comprised of a cylindrically shaped handle 28 adapted to be grasped by the hand. The axis of the tool bit shank 12 and of the handle 28 coincide, with the end 16 of the shank disposed within the handle. A cup-shaped ball cage member 30, having a cylindric wall portion 32 and an inwardly disposed flange portion 34, is secured within the upper end 36 of the handle by means of closure pins 38 which may be staked in the handle after insertion. A cap 40 closes the upper end of the handle and is secured thereto by the closure pins 38.

Referring to FIGS. 1 and 6, it will be seen that the inturned flange portion 34 of the ball cage member 30 is provided with three elongated recesses 42, more particularly referenced on FIG. 6 as 42a, 42b, and 42c, within which are disposed three torque transmitting balls 44, referenced as 44a, 44b, and 44c. The recesses extend for their full depth from face to face of the flange portion 34. A coiled compression spring 46 is disposed about the bit shank 12 and has one end bearing against one face of a washer 48, the other face of which is thereby urged against the outer face 50 of the flange portion 34. The force of the spring against the washer serves to maintain the balls 44 with an upper segment thereof above the inner face 52 of the flange portion 34 which is dimensionally somewhat smaller in thickness than the diameter of the balls, all as best seen in FIG. 9.

The positioning of the cam plate member 20 and the ball cage member 30 is such that when any three recesses 22, equidistantly disposed about the cam plate member 20, are aligned with the three balls 44, the latter are received therewithin. But it will be noted that the diameters of the cam plate recesses are somewhat less than that of the balls, wherefor the balls are not received entirely within the recesses. Preferably, the ratio of the diameters of the recesses to the diameters of the balls is of the order of $\frac{1}{2}\sqrt{2}$ for a purpose which will now be explained.

Referring to FIG. 4, there is shown by dot-dash line the ball 44a wholly disposed within recess 42a of the cage flange 34 and received as much as may be within the recess 22a of the plate member 20. Since the recess 22a is preferably cylindrical, the entire outer edge thereof is in contact with the ball. Torque applied to the handle 28 is resisted by the bit 14 (FIG. 1) when threading in a screw 59 for example. Torque on the handle is transmitted from the handle 28 to the ball cage member 30, and thence through what amounts to substantially a point contact 54 between the wall 22a of the plate 20 and the ball 44a, as shown by the dot-dash lines. Of course, the resultant of forces on the ball at contact point 54 is normal to the surface thereof, hence there is a component of force normal to the torque component. These are shown in FIG. 5 with the torque force labeled $F_t$, the resultant force $F_r$, and the normal force $F_s$, the latter being the force resisted by the spring 46.

Since, as aforesaid, the ratio of the diameter of the recess 22a is preferably of the order of $\frac{1}{2}\sqrt{2}$, the angle $\alpha$ between the forces $F_t$ and $F_r$ is 45°, where (by assumption) the ball 44a is received substantially within recess 22a so as to rest on the entire edge thereof. Hence $F_t$ is always nearly equal to $F_s$ below the torque limit. As the torque limit is reached with increasing resistance of the tool bit 14, $F_s$ becomes equal to the force exerted by the spring 46 on the ball 44a through the washer 48. A small additional increment of $F_t$ causes the ball 44a to depress slightly within the recess against the force of the spring, and the ball cage member 30 is thereby allowed to rotate slightly relative to the cam plate member 20, whereupon the angle $\alpha$ increases. Thus the required force $F_t$ becomes less than the force actually applied, hence the ball will be rapidly moved downwardly against the slightly increasing spring force, and toward the recess 22b until cage and ball assume the position shown by the full lines with the contact point 56 of the recess 22b in contact with the ball. This is an unstable equilibrium positioning of the parts whereby a very slight additional movement of the cage and ball results in upward movement of the ball with a tendency to snap upward under the influence of the bias spring 46.

Observe that if the ball cage recess 42a were to be sized only slightly larger than the ball 44a, the ball would exert a reverse torque force against the contact point 56 during the time it took the ball cage to advance the ball up to its nest in recess 22b, as shown by the dashed lines.

However, the novel provision of elongated recesses in the ball cage member allows the ball to snap toward the recess wall face 43a and to be arrested either thereat or against the edge contact point 58 of the wall 26b, with only a momentary force exerted against contact point 56. If the recess is such that the snap of the ball is arrested substantially by the wall face 43a, the force of the ball snap is exhibited as an impact thereat which is transmitted to the handle, as aforesaid. It is also apparent that if the impact of the ball on the cage wall is of no consequence, then the cage recesses may be elongated somewhat more than that shown, whereby substantially all the snap impact of the ball would be manifest at the contact point 58 with a resultant tendency to impart a slight additional "snap torque" to the tool bit through the cam plate.

It is appreciated, of course, that friction forces between the ball 44a and portions of the plate member 20, the cage member 30, and the washer 48 cannot be neglected entirely in the consideration of the forces $F_r$, $F_b$, and $F_s$. However, by judicious lubrication of the sliding parts, and/or by proper selection of materials, friction can be minimized to the point where it can be neglected for all practical purposes, as will be evident to those skilled in the art.

It has been stated hereinabove that one end of the spring 46 is urged against the washer 48. It is now seen that the urging force may be varied by adjustment of the coiled length of the spring to vary the torque limiting effect in the operation of the tool. To this end there is provided an adjusting sleeve 60 threadably received within the handle 28 by means of threads 62. The sleeve 60 is a thin sectioned cylindrical member disposed about the torque axis of the tool 10. The upper end 64 of the sleeve 60 is provided with an outwardly flanged portion 66 adapted to contact an inwardly disposed shoulder portion 68 of the handle 28 to prevent the sleeve from being inadvertently removed and to prevent jamming of parts later to be described.

The lower end of the spring 46 bears on an upper surface 70 at the end of the upper end 64 of the sleeve 60. The lower end 72 of the sleeve 60 has secured to its outer periphery, by means of a recessed set screw 74, an indicia sleeve 76. The lower end portion 78 of the handle 28 is of reduced section to permit the indicia sleeve 76 to be received therewithin when the adjusting sleeve 60 is screwed up into the handle 28.

The indicia sleeve 76 is provided with longitudinally disposed indicia markings 80 arranged to cooperate with other indicia marks 82 disposed around the frusto-conical surface 84 on the end of the lower end portion 78 of the handle 28. The marks on the surface 84 are ten in number, and one complete rotation of the sleeve 60 relative to the handle 28 moves the lower end of the handle a distance equal to that separating two of the marks 80. This, of course, is a measure of the pitch of the threads 62. Therefore, the rotation of the sleeve 60 to carry the longitudinally extending index line 86 thereon from one of the marks 82 to its neighbor will extend or retract the sleeve 60 one-tenth of the distance between any two neighboring marks 80.

It is now seen that rotation of the sleeve 60 relative to the handle 28 causes the length of the spring 46 to be changed, hence the force thereof exhibited against the washer 48 thus changes the torque limiting function of the tool. The indicia markings 80 and 82, in cooperation with the index line 86, provide the means for setting the tool to predetermined limits of torque and may be suitably selected for the range of the particular tool.

It is not desirable that the sleeve 60 be freely rotatable in the handle since torque settings of the tool might be inadvertently changed. To this end there is provided a slidable lock tube 88 disposed about the bit shank 12 and within the sleeve 60. The tube 88 is freely slidable between the shank and the sleeve and is urged outwardly by a light coiled compression spring 90 having one end bearing against the end of the sleeve 60 and the other end bearing against the inner end of the knurled collar 92, which is secured to the tube 88 by means of a setscrew 94.

In order to limit outward sliding movement of the tube 88 relative to the sleeve 60, the inner end 96 of the tube 88 is provided with a pair of radially extending diametrically disposed lugs 98 which are slidably received within deep slots 100 extending from the upper surface 70 longitudinally into the upper end 64 of the sleeve 60. Bottoming of the lugs 98 in the slots 100 limits outward sliding movement of the tube 88 in the sleeve 60.

Ball detent means for locking rotation of the sleeve 60 in the handle 28 comprise a pair of balls 102 disposed within radially extending bores 104 in the upper end 64 of the sleeve 60, the balls being cooperative with longitudinally extending elongated grooves 106 provided in the lock body 108 securely disposed in the handle 28. An even number of grooves 106 is provided to number as many as the number of indicia marks 82, in this case ten in number. As seen in FIG. 8, the disposition of the balls 102 in the bores 104 and in the grooves 106 effectively provides locking action to prevent rotation of the sleeve 60 in the handle 28, the balls being held in the grooves by the inner end 96 of the tube 88.

Figure 2:
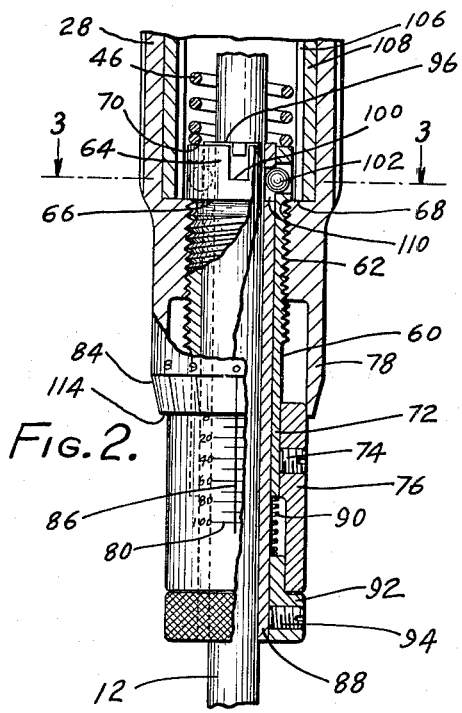
FIG. 2 is a fragmentary partially sectioned view of a portion of the embodiment, similar to FIG. 1 but showing the position of certain parts in connection with the operation of changing the torque limit setting of the tool.
Figure 3:
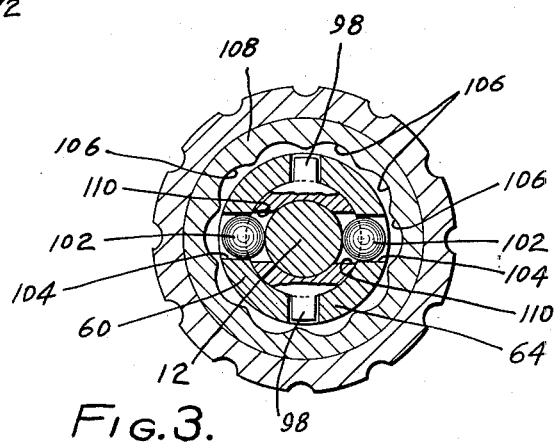
FIG. 3 is a cross section view taken on the line 3—3 of FIG. 2, showing adjustment locking parts.

In order to unlock the tool to change the torque limit setting, the tube 88 is provided with a pair of radial diametrically disposed recesses 110 spaced somewhat distally of the inner end 96 of the tube, as shown in FIGS. 1, 2, and 3. As the knurled collar 92 is pushed inwardly against the bias of the spring 90, the recesses 110 move to a position opposite the bores 104 in the sleeve 60, as shown in FIGS. 2 and 3, whereupon the balls 102 descend into the recesses 110 and out of engagement with the grooves 106 in the lock body 108, as shown in FIG. 3, whereafter the tube 88 and sleeve 60 may be rotated. Rotation of the tube 88 is transmitted to the sleeve 60 by the lugs 98. When the desired torque limit adjustment is obtained, as shown by the indicia marks 80 and 82 and the index line 86, the knurled collar 92 is released, whereafter the spring 90 urges the lock tube 88 outwardly which causes the balls 102 to be snapped out of the recesses 110 and back into the grooves 106 to lock the selected adjustment.

The arrangement of parts is such that when the balls 102 are locked in the grooves one of the indicia marks 82 is disposed opposite the index line 86. Also, it will be observed that the radius of the balls 102 is somewhat greater than the wall thickness of the lock tube 88 in order that the balls will be snapped readily out of the recesses when an adjustment has been completed.

It will also be apparent that the tool bit shank 12 floats freely within the lock tube 88, and that thrust of the shank will be absorbed in a thrust screw 112 threadably disposed within the cap 40 of the handle 28.

As aforesaid, the tool is provided with means to be calibrated for commercial tolerances of the spring 46, or for recalibration when the parts become worn in use. To this end the entire tool is assembled with thrust screw 112 screwed in far enough to cause the cam plate member 20 to urge the balls 44 into contact with the washer 48 and thus take up all the play in the various parts. Thereafter, the screwdriver bit 14 is engaged with a torque meter. The handle 28 is then turned until the cam plate member 20 glides over the balls 44. The knurled collar 92 is depressed and rotated until the torque meter reads at "10" ounce-inches (for a particular embodiment described herein) when the handle 28 turns at the 10 ounce-inch torque limit without the shank 12 turning, after which the tool is removed from the torque meter.

The knurled collar is then allowed to be released with the handle 28 and adjusting sleeve 60 locked by the balls 102. This represents a 10 ounce-inch torque limit setting, and the indicia sleeve 76 is set accordingly by first loosening the setscrew 74 and moving the sleeve until the index line 86 thereon is aligned with the zero mark on the lower end 78 of the handle 28 and the "ten" mark on the sleeve 76 is disposed adjacent the bottom edge 114 of the lower end 78 of the handle, after which the setscrew is snugged up but not tightened with a set.

The knurled collar is then depressed again and turned until the indicia marks indicate 100 ounce-inches, and the knurled collar again released. The tool is then re-engaged with the torque meter and turned until a reading is had at the new torque limit setting of 100 ounce-inches. If the torque meter reading is above or below 100 ounce-inches, the thrust screw 112 is screwed outwardly or inwardly until the torque meter indicates the torque limit setting of 100 ounce-inches.

The sequence of checks at the 10 and 100 ounce-inch settings is then repeated and fine adjustments of the indicia sleeve 76 and thrust screw 112 made as necessary until the tool checks out at these or any intermediate readings. The tool is thus easily calibrated.

The torque meter referred to hereinabove is an instrument well known to those skilled in the art and requires no detailed description since it forms no part of the invention.

As will be apparent, adjustment of the thrust screw 112 for calibration will result in displacement of the cam plate member 20 with respect to the ball cage member 30. Referring to FIG. 9, there is shown a somewhat exaggerated displacement of the cam plate 20 by the dashed lines, where the torque meter reading is over 100 inch-ounces for a tool setting of that amount and it is necessary to reduce the force component required to overcome the spring force component. The showing is exaggerated to the extent that commercial tolerance requirements of springs are met. With modern technology spring tolerances, such as free uncompressed length and spring rate, can be easily kept within relatively narrow ranges and thus not require more than nominal calibration of the tool.

Fairly close spring tolerances are desirable in order that the cam plate will not be displaced more than a nominal amount and thereby be kept within substantially the force component relationships discussed at length hereinabove.

After calibration is complete, it may be desirable to assure the position of the thrust screw 112. To this end the void space in the cavity above the screw may be filled with a sealing cement such as that characterized by Glyptal or any other preferred material as will be evident to those skilled in the art.

It is also apparent by now that whereas the preferred embodiment is disclosed as a tool wherein torque is to be applied to the ball cage and thence to the cam plate by way of the torque transmitting balls and thence to the tool bit, the particular relationship of these members and elements need not be exactly as described but could take other forms and arrangements, and it is not intended to limit the invention to the embodiment shown and described.

I claim:

1. A torque limiting tool for driving a part, comprising: a first member arranged for connection with a part to be driven, said first member defining an axis about which torque is to be applied to the driven part by said member, said first member defining a recess depending at least part way into said first member; a second member arranged for connection with a source of torque, said second member defining an axis substantially coincidental with the axis of said first member, said second member defining a recess depending at least part way into said second member, said members being positioned with said recesses substantially adjacent and facing each other; a rollable torque transmitting element movably disposed in one of said recesses; resilient means disposed to urge said element outwardly from said one of said recesses toward said other of said recesses, said other of said recesses characterized as being dimensionally somewhat smaller than said element to the extent that said element is received only partially therewithin and contacts an edge of said other of said recesses under the urging of said resilient means, whereby torque imparted to said second member is transmitted to said first member through the contact of said element with the edge of said other of said recesses with a torque force component substantially normal to the component of force of said resilient means, whereby said part will be driven until the magnitude of the torque force component becomes large enough to overcome the resilient means force component whereafter said element will be forced against the urging of said resilient means deeper into the said one of said recesses and said members are thereby permitted to be displaced relative to each other about their common axis; first means for adjusting the relationship between the facing surfaces of said members and hence the force with which said resilient means urges said torque element against the said edge of said other of said recesses, whereby said tool may be calibrated for departures of said resilient means from a predetermined specification therefor; and second means for adjusting the force of said resilient means to various predetermined torque limits of said tool whereby the torque force component necessary to depress said element may be set on a calibrated scale on said tool.

2. A torque limiting tool for driving a part, comprising a part, comprising: a first member arranged for connection with a part to be driven, said first member having a face portion radially disposed about a driving axis, said first member defining a recess projecting inwardly therefrom; a second member arranged for connection with a source of torque, said second member having a face portion radially disposed about the same axis as said first member face portion, said second member defining a recess projecting inwardly therefrom, said members being positioned with said recesses substantially adjacent and facing each other; a torque transmitting ball element movably disposed in one of said recesses, said one of said recesses being generally cylindrical in configuration and slightly larger than said ball element; spring means having one end disposed adjacent said ball element at an end of said one of said recesses opposite to the adjacent faces of said members, said spring means tending to urge said ball element outwardly from said one of said recesses toward said other of said recesses, said other of said recesses characterized as being dimensionally somewhat smaller than said element to the extent that said element is received only partially therewithin and contacts an edge of said other of said recesses under the urging of said spring means, whereby torque imparted to said second member is transmitted to said first member through the contact of said element with the edge of said other of said recesses with a torque force component substantially normal to the component of force of said spring means, whereby said part will be driven until the magnitude of the torque force component becomes large enough to overcome the spring means force component whereafter said element will be forced against the urging of said spring means deeper into the said one of said recesses and said members are thereby permitted to be displaced relative to each other about their common axis; first means for adjusting the distance between the facing surfaces of said members and hence the force with which said spring means urges ball element against the said edge of said other of said recesses, whereby said tool may be calibrated for departures of said spring means from a predetermined specification therefor; and second means for adjusting the force of said spring means to various predetermined torque limits of said tool whereby the torque force component necessary to depress said ball element may be set on a calibrated scale on said tool.

3. A torque limiting tool for driving a part, comprising: a first member arranged for connection with a part to be driven, said first member defining an axis about which torque is to be applied to the driven part by said member, said first member defining a recess depending at least part way into said first member; a second member arranged for connection with a source of torque, said second member defining an axis substantially coincidental with the axis of said first member, said second member defining a recess depending at least part way into said second member, said members being positioned with said recesses substantially adjacent and facing each other; a rollable torque transmitting element movably disposed in one of said recesses; and resilient means disposed to urge said element outwardly from said one of said recesses toward said other of said recesses, said other of said recesses characterized as being dimensionally somewhat smaller than said element to the extent that said element is received only partially therewithin and contacts an edge of said other of said recesses under the urging of said resilient means, whereby torque imparted to said member is transmitted to said first member through the contact of said element with the edge of said other of said recesses with a torque force component substantially normal to the component of force of said resilient means, whereby said part will be driven until the magnitude of the torque force component becomes large enough to overcome the resilient means force component whereafter said element will be forced against the urging of said resilient means deeper into the said one of said recesses and said members are thereby permitted to be displaced relative to each other about their common axis, said member defining said other of said recesses further defining yet another recess depending at least part way thereinto and disposed distally of said other of said recesses in a direction substantially opposite to that of said torque force component, said one of said recesses being characterized as elongated in the direction of the torque force component, whereby said element is restrained against rolling at an end wall of said elongated recess upon the application of torque to said second member until said members are displaced relative to each other to the extent that an edge of said another recess passes over the center of said element whereafter said element is urged toward the other end wall of said elongated recess under the urging of said resilient means.

4. A torque limiting tool for driving a part, comprising: a shank member defining an axis; a cylindrically shaped member defining an axis, said shank member being disposed within said shaped member with axes coinciding; a disc-like cam plate member having a face portion radially disposed; a disclike ball cage member having a face portion radially disposed, one of said disclike members being secured to said shank member and the other secured to said shaped member with said face portions adjacent and facing each other, both said disclike members defining recesses projecting inwardly from said face portions; a torque transmitting ball element movably disposed in one of said recesses in said cage member, said one of said recesses being generally cylindrical in configuration and elongated in a general circumferential direction about said axis to provide substantial moving space for said ball element therein, the other of said recesses in said plate member being of such configuration as to prevent said ball element from entering wholly therewithin; and spring means urging said ball element toward said other of said recesses.

5. A torque limiting tool for driving a part, comprising: a shank member defining an axis; a cylindrically shaped member defining an axis, said shank member being disposed within said shaped member with axes coinciding; a disclike cam plate member having a face portion radially disposed; a disclike ball cage member having a face portion radially disposed, one of said disclike members being secured to said shank member and the other secured to said shaped member with said face portions adjacent and facing each other, both said disclike members defining recesses projecting inwardly from said face portions; a torque transmitting ball element interposed between said face portions in said recesses; means adjustably secured relative to one of said disclike members for adjusting the relationship between the facing surfaces of said disclike members; an adjusting sleeve member threadably received and freely rotative within said shaped member, one of said sleeve and shaped members defining an elongate groove and the other defining a depression adjacent said groove; a detent ball disposed in said depression; resiliently biased means urging said detent ball outwardly of said depression to engage said groove and thus prevent rotation of said sleeve member relative to said shaped member; means for releasing said biased means to permit said detent ball to disengage said groove and thus permit rotation of said sleeve member relative to said shaped member; and spring means interposed between said adjusting sleeve and said ball element.

6. A torque limiting tool for driving a part, comprising: a shank member defining an axis; a cylindrically shaped member defining an axis, said shank member being disposed within said shaped member with axes coinciding, said shaped member having an elongate groove longitudinally disposed in the inner surface thereof, one of said members being arranged for connection with a part to be driven, the other of said members being arranged for connection with a source of torque to be applied about said axis; a disclike cam plate member having a face portion radially disposed; a disclike ball cage member having a face portion radially disposed, one of said disclike members being secured to said shank member and the other secured to said shaped member with said face portions adjacent and facing each other, each of said disclike members defining a plurality of recesses radially disposed equidistantly and projecting inwardly from said face portions; torque transmitting ball elements movably disposed in said recesses in said cage member, said recesses in said cage member being generally cylindrical in configuration and elongated in a generally circumferential direction about said axis to provide substantial moving space for said ball elements therein about said axis; spring means within said shaped means and having one end arranged to urge said ball elements toward said recesses in said plate member; an adjusting sleeve threadably received and freely rotative within said shaped member and around said shank member and having an end engaged with the other end of said spring means, said sleeve member having a bore extending inwardly from the outer surface thereof adjacent said groove in said shaped member; a detent ball movably disposed in said bore in said sleeve member; a tube member disposed intermediate said shank and sleeve members, said tube having an end portion arranged to urge said detent ball outwardly of said bore to engage said groove, said tube member being further provided with a recessed portion adjacent said end portion for receiving said detent ball therein, whereby when said tube member is slid within said sleeve member said detent ball is alternatively urged into or out of said groove to respectively prevent or permit rotation of said sleeve member relative to said shaped member; and adjusting means threadably disposed within an end wall of said shaped member and disposed along the axis thereof, an end of said adjusting means being arranged in contact with an adjacent end of said shank member for adjusting the distance between the facing surfaces of said disclike members and hence the force with which said spring means urges said ball elements toward said recesses in said plate member, whereby said tool may be calibrated for departures of said spring means from a predetermined specification therefor.

References Cited in the file of this patent

UNITED STATES PATENTS

| | | |
|---|---|---|
| 1,881,633 | Johnson | Oct. 11, 1932 |
| 2,038,466 | Yates | Apr. 21, 1936 |
| 2,396,040 | Darling | Mar. 5, 1946 |
| 2,732,747 | Livermont | Jan 31, 1956 |
| 2,771,804 | Better et al. | Nov. 27, 1956 |
| 2,791,304 | Better et al. | May 7, 1957 |
| 2,820,381 | White | Jan. 21, 1958 |
| 2,857,793 | Peras | Oct. 28, 1958 |
| 2,887,921 | Livermont | May 26, 1959 |
| 2,918,834 | Cranford | Dec. 29, 1959 |
| 2,923,191 | Fulop | Feb. 2, 1960 |
| 2,927,672 | Banner | Mar. 8, 1960 |
| 2,933,959 | McMahon | Apr. 26, 1960 |
| 2,940,571 | Bernhard | June 14, 1960 |

FOREIGN PATENTS

| | | |
|---|---|---|
| 846,203 | France | May 27, 1939 |
| 418,415 | Great Britain | Oct. 24, 1934 |
| 674,352 | Great Britain | June 25, 1952 |

UNITED STATES PATENT OFFICE
CERTIFICATE OF CORRECTION

Patent No. 3,001,430 September 26, 1961

James W. Cranford

It is hereby certified that error appears in the above numbered patent requiring correction and that the said Letters Patent should read as corrected below.

Column 1, line 14, for "user" read -- used --; column 5, line 40, for "rmeoved" read -- removed --; column 8, line 32, strike out "a part, comprising"; column 9, line 63, for "general" read -- generally --.

Signed and sealed this 6th day of March 1962.

(SEAL)
Attest:

ERNEST W. SWIDER
Attesting Officer

DAVID L. LADD
Commissioner of Patents